United States Patent [19]

Clodfelter

[11] 4,153,282
[45] May 8, 1979

[54] CONED JOINT FOR JOINING DISSIMILAR DIAMETER FILAMENT WOUND TUBES

[75] Inventor: Glen A. Clodfelter, Madison, Ala.

[73] Assignee: The United States of America as represented by the Secretary of the Army, Washington, D.C.

[21] Appl. No.: 881,976

[22] Filed: Feb. 27, 1978

Related U.S. Application Data

[62] Division of Ser. No. 794,329, May 5, 1977, Pat. No. 4,108,700.

[51] Int. Cl.² .......................... F16L 21/06; F41F 3/04
[52] U.S. Cl. .................................. 285/332.3; 285/423; 285/DIG. 16; 89/1.816; 89/16; 428/36
[58] Field of Search ................. 89/1.816, 16; 285/332, 285/302, 332.2, 332.3, 423, DIG. 16; 403/334; 428/12, 36

[56] References Cited

U.S. PATENT DOCUMENTS

| | | | |
|---|---|---|---|
| 2,186,351 | 1/1940 | Stojaneck | 403/334 |
| 2,791,453 | 5/1957 | Baker et al. | 403/334 |
| 3,269,743 | 8/1966 | Barreca | 285/DIG. 16 |
| 3,378,283 | 4/1968 | Boocock et al. | 285/332.2 |
| 3,421,782 | 1/1969 | Kalish et al. | 285/423 |
| 3,476,408 | 11/1969 | Wolfe | 285/423 |
| 3,745,876 | 7/1973 | Rocha | 89/1.816 |
| 3,847,392 | 11/1974 | Horwinski | 285/302 |
| 3,936,206 | 2/1976 | Meisberger | 403/334 |
| 3,960,054 | 6/1976 | Looger | 89/1.816 |
| 3,972,548 | 8/1976 | Roseen | 285/423 |
| 4,022,500 | 5/1977 | van den Beld | 285/DIG. 16 |

FOREIGN PATENT DOCUMENTS 1520421  3/1968  France ................................ 89/1.816

*Primary Examiner*—William R. Dixon, Jr.
*Attorney, Agent, or Firm*—Nathan Edelberg; Robert P. Gibson; Harold W. Hilton

[57] ABSTRACT

A coned joint for the purpose of structurally joining two filament wound tubes, having dissimilar diameters, into a single launch tube. After being joined together, the assembled tubes have a straightness equal to or better than a comparable rolled or fabricated metal tube in addition to being lighter and less costly to produce.

2 Claims, 1 Drawing Figure

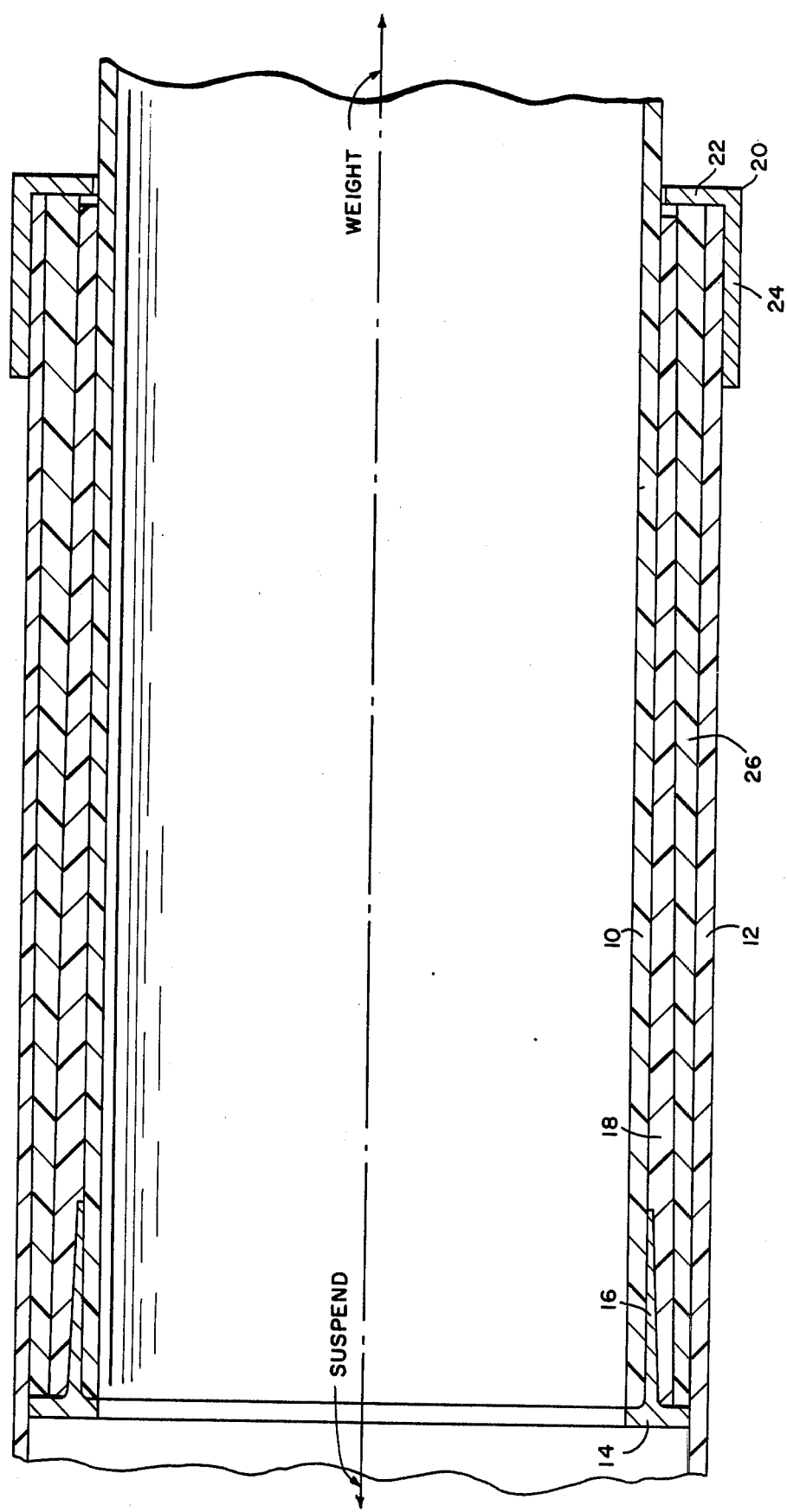

CONED JOINT FOR JOINING DISSIMILAR DIAMETER FILAMENT WOUND TUBES

DEDICATORY CLAUSE

The invention described herein may be manufactured, used, and licensed by or for the Government for governmental purposes without the payment to me of any royalties thereon.

This is a division of application Ser. No. 794,392, filed May 5, 1977 now U.S. Pat. No. 4,108,700.

BACKGROUND OF THE INVENTION

This invention relates to the field of rocket launchers. Recently interest has been generated in the filament wound composite tubes for use as rocket launcher tubes. The composites have high strength to weight ratios in comparison to metals. Composites are also generally less costly to produce in production processes. For these reasons, the filament wound composites are excellant candidates for use as rocket launch tubes.

SUMMARY OF THE INVENTION

The present invention has provided a solution to the problem of joining filament wound tubes having two dissimilar diameters. A device is used which permits accuracy in alignment between the two tubes. The device includes a step face ring for attachment to one tube and a joint ring is attached to the other tube. A cone joint is placed internally of one tube and externally of the other tube for attaching to two dissimilar diamater tubes together.

This invention may be understood from the following detailed description taken in conjunction with the accompanying drawing.

BRIEF DESCRIPTION OF THE DRAWING

The single FIGURE shown is a sectional view of the device.

DESCRIPTION OF THE PREFERRED EMBODIMENT

Referring to the drawing reference numeral 10 identifies a filament wound tube having a diameter smaller than filament wound tube 12. A step face ring 14 is attached to the mating end of tube 10 by adhesive bonding. The tube 10 and tongue 16 of the step face ring is overwrapped with a glass cloth/resin system to the length and thickness desired and then cured. This overwrap 18 is conically ground to the required shape and length with the larger diameter being next to the step face ring 14. The grinding results in the surface of the overwrap 18 being conical in shape as it tapers toward the smaller diameter tube.

Joint ring 20 has an inwardly projecting flange 22 and a downwardly projecting flange 24 that is adhesively bonded to the mating end of the larger tube 12. A taper joint ring 26 is prepared from a glass cloth/resin system and wound on an appropriately tapered mandrel. After curing the exterior of the taper joint ring is ground to a diameter that provides a slip fit into tube 12. The taper joint ring 26 is then sawed into two halves at an angle of approximately 5 degrees with the axis. This permits assembly into tube 12 for a fully adhesively bonded surface. The two halves of the taper joint ring 26 are adhesively bonded to the inside of tube 12 as separate parts with the thicker ends seated against the joint ring 20. The adhesive is applied to the interior of tube 12 for the length of the joint. Then one half of the taper joint ring is slid through the length of the larger diameter tube 12 so that the thicker end seats against the joint ring leg 22. The other half of the tapered joint ring 26 is installed in a similar manner. Adhesive is then applied to the inside surface of the installed halves of the taper joint ring 26. The smaller diameter tube 10 is then slid through the end of the larger tube and the conical surfaces are seated together with step face ring 14 abutting the end of taper joint ring 26. The smaller diameter tube 10 with overwrap 18, tapered joint ring halves 26 and larger diameter tube 12 are assembled with the adhesive wet. The assembly is then hung from a plug in the end of the larger diameter tube 12 and a weight from a plug in the end of smaller diameter tube 10, and the adhesive permitted to cure or dry. This permits the critical interfacing surfaces to be pulled securely together to obtain maximum straightness between the two tubes.

I claim:

1. A coned joint for joining two filament wound tubes having dissimilar diameters comprising: a step face ring for attachment to the mating end of the smaller diameter tube; means for attaching said ring to said tube; a joint ring for attachment to the mating end of the larger diameter tube; a taper joint ring disposed between said tubes and being adhesively joined externally to the interior of said larger diameter tube and adhesively joined interiorly to the tapered exterior of said smaller diameter tube to join the two tubes together.

2. A coned joint as set forth in claim 1 wherein said taper joint ring comprises two half rings.

* * * * *